Feb. 18, 1969  E. J. EBERHART  3,427,734
TREE DIGGER CONSTRUCTION
Filed May 26, 1966
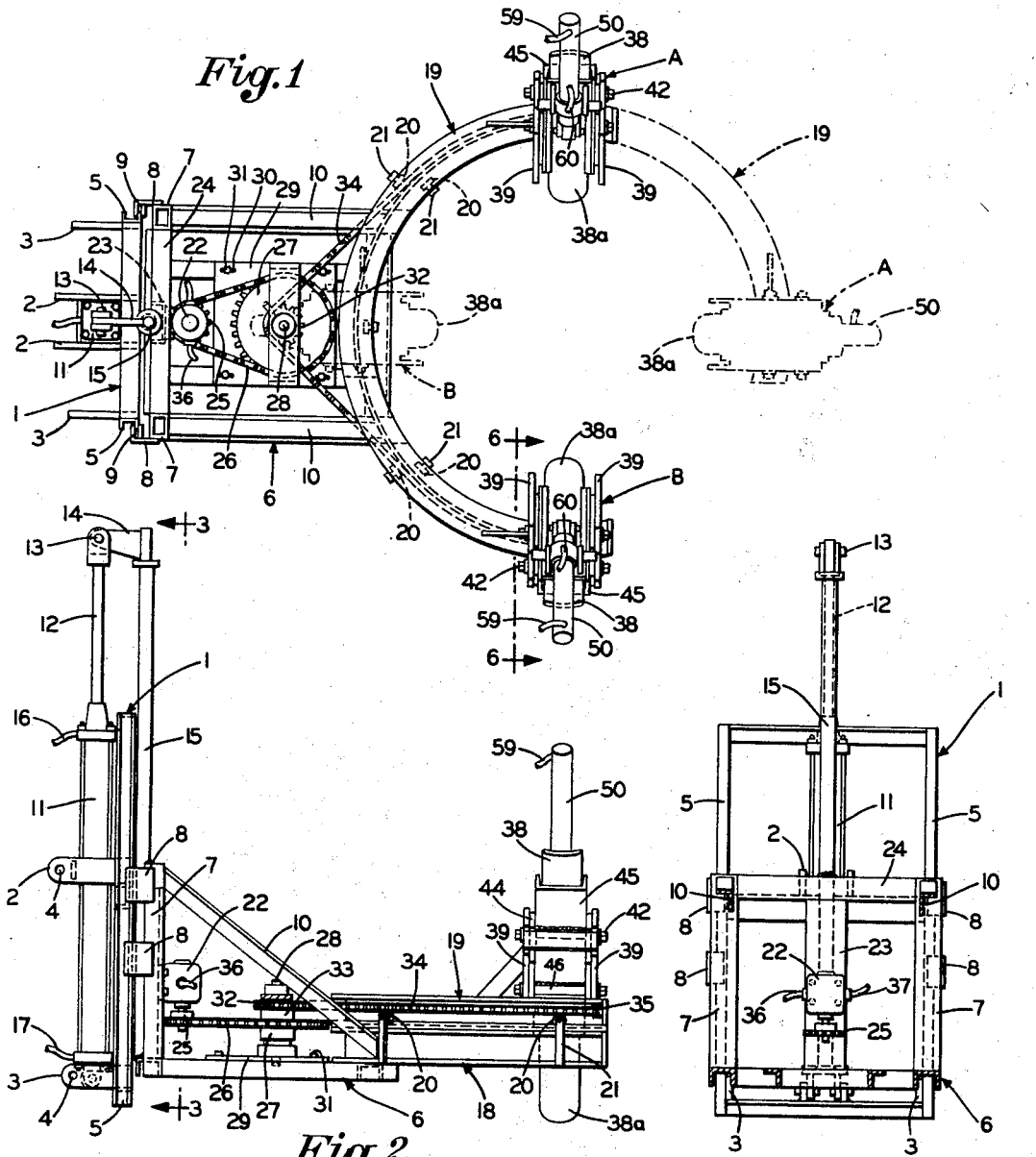
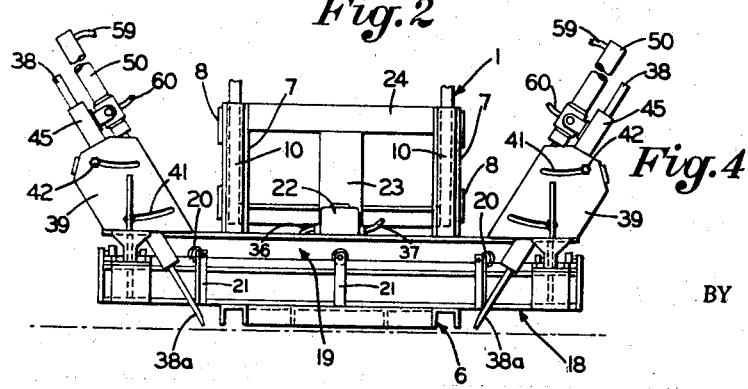
INVENTOR.
Edwin J. Eberhart
BY
Frease & Bishop
ATTORNEYS

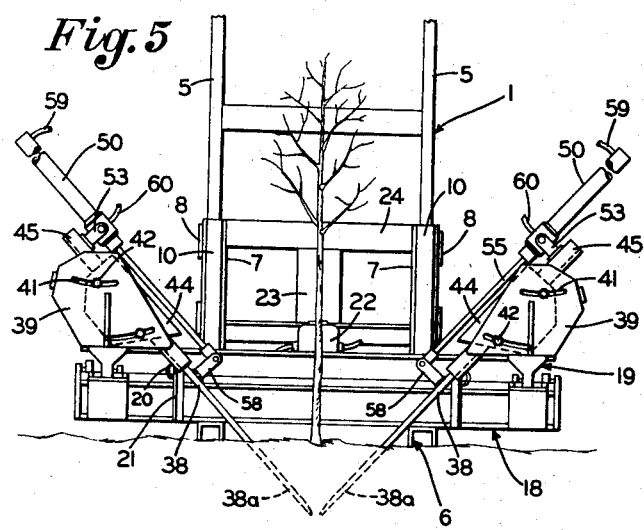

United States Patent Office 3,427,734
Patented Feb. 18, 1969

3,427,734
TREE DIGGER CONSTRUCTION
Edwin J. Eberhart, R.D. 1, near
Bolivar, Ohio 44612
Filed May 26, 1966, Ser. No. 553,155
U.S. Cl. 37—2                                 9 Claims
Int. Cl. A01g 23/06

ABSTRACT OF THE DISCLOSURE

A tree digger having support means, a substantially semi-circular horizontal bed vertically movable upon the support means, a substantially semi-circular frame rotatably slidable upon the bed, and a pair of opposed angularly disposed, downwardly converging spade blades slidably mounted at opposite ends of the rotatable frame.

---

The invention relates to apparatus for digging trees for transplanting, or for balling and burlapping, and more particularly to a machine for cutting a conical ball of earth with the tree roots embedded therein.

In large-scale operations in the nursery industry, wherein large numbers of trees are handled for transplanting, or for balling and burlapping, it is necessary that the trees be dug rapidly. Various attempts have been made to produce machines for digging trees for transplanting and the like, but such machines have either proven unsatisfactory for proper transplanting of trees, or have been so complicated that the cost of the same is prohibitive.

A primary object of the present invention is to provide a simple, inexpensive and easily operated apparatus for quickly and readily digging trees for transplanting, or for balling and burlapping.

Another object of the invention is to provide such an apparatus which may be easily attached to a tractor, or other vehicle, by means of which the tree digging apparatus may be moved to position adjacent a tree to be dug, and by means of which the tree roots may be cut completely around a tree, with a conical ball of earth surrounding the roots, and the dug trees may be lifted from the ground and transported to any desired location, and either raised or lowered for depositing in a trunk upon a pallet or the like.

A further object of the invention is to provide a tree digging apparatus of the character referred to which comprises a vertical frame with means for attaching the same to a tractor or other vehicle, a vertically movable, substantially horizontal platform being slidably mounted upon said vertical frame, the tree digging mechanism being carried by said platform.

A still further object of the invention is to provide such a three digging apparatus in which the tree digging mechanism includes a generally semi-circular bed fixed upon the vertcally movable platform and a generally semi-circular, movable, slidably mounted frame for rotatable movement on the bed, angular disposed spade-like blades being carried by said generally semi-circular movable frame, adapted to be projected into the ground for cutting around the roots of a tree and cutting a conical ball of earth therewith.

It is also an object of the invention to provide fluid-operated cylinder means for slidably raising and lowering the platform upon the vertical frame, and other fluid-operated cylinder means for projecting the spade-like blades into the ground surrounding the roots of a tree.

Another object of the invention is to provide means for changing the angularity of the spade-like blades for adjusting the apparatus for digging trees of various sizes.

A further object of the invention is to provide a novel means for rotatably moving the generally semi-circular movable frame upon the generally semi-circular or horseshoe-shaped bed.

The above objects and others which will be apparent from the drawings and following description, may be attained, the above described difficulties overcome and the advantages and results obtained, by the apparatus, construction, arrangements and combinations, subcombinations and parts which comprise the present invention, a preferred embodiment of which, illustrative of the best mode in which applicant has contemplated applying the principle, being set forth in detail in the following description and illustrated in the accompanying drawings.

In general terms, the invention may be briefly described as comprising a vertical frame adapted to be attached to a tractor or the like, a platform, similar to the carriage of a fork-lift truck, being mounted for vertical movement upon said vertical frame through operation of the piston rod of a vertical cylinder stationary relative to the vertical frame.

The platform carries a horseshoe-shaped or generally semi-circular bed which may include a little more than a 180° extent, and a similarly shaped movable frame is slidably mounted for rotatable movement on said horseshoe-shaped bed and retained thereon by means of rollers or the like.

A pair of brackets or side plates are mounted on the movable frame adjacent the open ends thereof, each bracket having an angled slide guide along which a slide member is slidably moved by a piston rod operated by an angled cylinder upon the bracket, spade-like blades being mounted at the lower ends of the slide members and converging downwardly toward each other.

Actuating mechanism for rotatably, slidably moving the movable frame upon the horseshoe-shaped frame is provided. This actuating mechanism may comprise sprocket chain and sprocket wheel gearing driven by a rotary motor, or may comprise cables located over a plurality of sheaves or pulleys driven by the piston of a fluid cylinder.

In the drawings, FIG. 1 is a top plan view of the tree digger construction to which the invention pertains;

FIG. 2 is a side elevation of the tree digger shown in FIG. 1, with parts broken away;

FIG. 3 is a vertical section taken on the line 3—3, FIG. 2;

FIG. 4 is a front elevation of the tree digger with the blades in retracted position and adjusted for digging large trees;

FIG. 5 is a similar view with the blades adjusted for digging a smaller tree and showing the blades in projected position;

FIG. 6 is an enlarged, detailed sectional view, taken on the line 6—6, FIG. 1, showing the stationary horseshoe-shaped bed and the rotatable frame in cross section, showing one of the brackets with adjustable guide and slide member and cylinder and piston for operating the same;

FIG. 7 is a detailed section of the line 7—7, FIG. 6;

FIG. 8 is a plan sectional view of a tree digger showing a modified form of actuating mechanism for the rotary sliding frame;

FIG. 9 is a horizontal section of the actuating mechanism on the line 9—9, FIG. 8;

FIG. 10 is a detailed section of the actuating mechanism on an enlarged scale taken on the line 10—10, FIG. 8; and FIG. 11 is a diagrammatic view of the cable and sheaves or pulleys for actuating the rotary frame.

Referring now more particularly to the construction illustrated in FIGS. 1 to 7, showing a preferred embodiment of the invention, a vertical frame is indicated generally at 1 for attachment to a tractor or other vehicle, for which purpose an upper pair of centrally disposed lugs 2 and a lower pair of side lugs 3 are provided, any suitable fastening means being connected to the lugs 2 and 3 by means of the apertures 4 therein and to the tractor or other vehicle for rigidly securing the vertical frame 1 in vertical position thereon. Opposite side edges of the vertical frame 1 are of channel shape as indicated at 5.

A platform, indicated generally at 6, similar to the platform of a fork-lift truck, is vertically slidably mounted upon the vertical frame 1. For this purpose, the platform 6 has the upright side members 7 at its rear end upon which are mounted the vertically spaced slide members 8, each of which has a channel portion 9 slidably engaging one flange of the adjacent vertical channel 5 of the vertical frame. Inclined struts 10 connect each forward corner of the platform 6 with the upper end of the adjacent upright side members 7.

For the purpose of raising and lowering the platform 6 upon the vertical frame 1, a vertically disposed, double-acting hydraulic or other fluid cylinder 11 is connected to the rear side of the vertical frame 1, the piston rod 12 thereof being connected as at 13 to the lug 14 upon the upper end of the vertical rod 15, the lower end of which is connected to the platform 6.

Hydraulic fluid or the like may be admitted as desired to either end of the cylinder 11 through the tubing 16 and 17 leading to any conventional control therefor upon the tractor or other vehicle.

A horseshoe-shaped or partially circular bed, indicated at 18, which is generally semi-circular but may include a little more than 180° extent, is rigidly connected to the forward end of the platform 6. A similarly shaped movable frame, indicated generally at 19, is slidably mounted for rotatable movement on the bed 18 and retained thereon as by rollers 20 pivotally mounted upon the upper ends of brackets 21 upon the inner and outer perimeters of the semi-circular bed 18.

As best shown in FIG. 6, both the stationary bed 18 and the movable frame 19 may be of I-beam cross-sectional shape, and the rollers 20 bear upon the top of the lower flange of the movable frame 19, holding it in sliding contact with the upper flange of the stationary bed 18.

Actuating mechanism is provided on the platform 6 for rotatably sliding the movable frame 19 upon the horseshoe-shaped bed 18. In the preferred embodiment of the invention illustrated in FIGS. 1 to 7, this actuating mechanism is shown as operated by a rotary motor 22.

This motor may be mounted upon the central vertical support 23, which is located midway between the upright side members 7, the lower end of said support 23 being connected to the rear end of the platform 6 and the upper end thereof being connected to the horizontal member 24, which is connected at opposite ends to the upper ends of the upright side members 7.

A small sprocket wheel 25 is fixed upon the shaft of the motor 22, and is connected by a sprocket chain 26 with a relatively large sprocket wheel 27 rotatable upon a vertical stub shaft 28. The stub shaft 28 is fixed at its lower end upon a horizontal plate 29 which is horizontally adjustably mounted upon the platform 6, as by the elongated slots 30 and bolts 31.

The relatively small sprocket wheel 32 is fixed to the hub 33 of the large sprocket wheel 27 so as to be rotatable therewith. A length of sprocket chain 34 is located around the sprocket wheel 32, opposite ends of said chain being connected to opposite ends of the rotary frame 19, as indicated at 35 in FIG. 2.

As shown in the drawings, the rotary motor 22 may be a hydraulic or other fluid-operated motor. Hydraulic fluid or the like may be admitted as desired to either side of the motor 22 through the tubing 36 and 37 leading to any conventional control therefor upon the tractor or other vehicle.

Angularly opposed digger blades 38a are mounted upon opposite ends of the rotary frame 19, for up and down sliding movement relative to said frame 19. For the purpose of mounting said digger blades so that they may be adjusted toward and from each other for digging trees of different sizes, a spaced pair of stationary brackets or side plates 39 are welded at their lower edges to the top flange of the rotary frame 19, near each end thereof, as best indicated at 40 in FIG. 6. Each side plate 39 has the upper and lower arcuate slots 41.

An adjusting bolt 42 is located through the corresponding slots 41 in each pair of side plates 39 and provided with nuts 43. The adjustable assembly mounted upon the bolts 42 comprises the spaced adjustable plates 44, the angularly disposed channel member 45 interposed therebetween, and the sleeves 46 through which the adjusting bolts 42 are located.

The sleeves are welded to the channel member 45 and to both adjustable plates 44, as shown at 47 and 48 respectively, in FIG. 7. At the edges of the flanges of the channel member 45 are located opposed ribs 49 and the slide 38 for the digger blade 38a is slidably mounted in the channel member 45 and retained therein by said ribs 49.

For the purpose of a slidably moving the digger blade in the guide channel member 45, a fluid cylinder 50 is provided. The cylinder is shown as provided with trunnions 51 received in bearing portions 52 of the spaced lugs 53 which are welded or otherwise connected to a cross piece 54 which is rigidly mounted upon the upper end of the channel member in any conventional manner.

The end of the piston rod 55 of the cylinder 50 is provided with a coupling head 56 connected by pin 57 to the spaced lugs 58 which are welded to the slide member 38 having the spade-like digger blade 38a upon its lower end. The cylinders 50 are hydraulically controlled through hydraulic lines 59 and 60 connected to opposite ends of the cylinders and connected to conventional hydraulic control mechanism upon the tractor or other vehicle.

With the mechanism above described, it will be seen that the adjustable assemblies carrying the digger blades may be adjusted between the side plates 39 from the position best shown in FIGS. 4 and 6 for digging a large tree, to the position shown in FIG. 5 for digging a small tree.

In the operation of the tree digger, with the digger blades 38a retracted, as shown in FIGS. 1, 2 and 4, and the rotary frame 19 in normal position, as shown in full lines in FIG. 1, hydraulic pressure may be admitted to the upper ends of the cylinders 50, through the hydraulic lines 59, projecting the blades 38a into the ground at opposite sides of the tree laterally, as shown in dotted lines in FIG. 5. The blades 38a are then retracted.

The motor 22 may then be actuated in a direction to move the rotary frame 19 a slight distance in clockwise direction, as viewed in FIG. 1. The cylinders 50 are again actuated to project the blades 38a into the ground, and the blades are again retracted and this operation is continued until the spade blade assembly indicated at A in FIG. 1 has moved to the broken line position shown therein.

The motor 22 is then operated to rotate the rotary frame 19 in counter-clockwise direction in intermittent steps, operating the cylinders 50 to project and again retract the spade blades 38a at each step, until the spade blade assembly indicated at B in full lines in FIG. 1 has been moved to the position of the assembly indicated at A in broken lines in said figure.

With the blades projected into the ground, as shown in FIG. 5, the cylinder 11 is then operated to raise the platform 6 and thus raise the tree with the roots and a conical ball of earth surrounding the same supported by the spade blades 38a. Obviously, if necessary, the cuts by the spade blades at any position may be made progressively by several projecting and retracting operations of the blades until the blades have penetrated to the proper depth.

When the entire conical ball of earth has been cut, the tree may be raised out of the ground by operation of the cylinder 11 to raise the platform and the bed 18 and rotary frame 19 therewith, and the tree may be held in this position while burlap is applied around the ball.

The tree also may be transported by the tractor while held in raised position and either raised or lowered to deposit the tree on a carrying vehicle or pallet or the like, or for transplanting it in a new position.

In the modification of the invention shown in FIGS. 8 to 11, all parts excepting the actuating mechanism for the rotary frame 19 are the same as shown and above described in FIGS. 1 to 7, and the same reference numerals are applied to similar parts thereof.

In this form of the invention, the rotary frame actuating mechanism is operated by a fluid cylinder 61 which may be located horizontally in a transversely disposed frame 62 mounted upon the platform 6. The piston rod 63 of the cylinder 61 has a yoke 64 upon its end within which are journalled the pulleys 65, 66, 67 and 68 upon the vertical shaft 69.

A pair of superimposed pulleys 70 and 71 are journalled upon a vertical shaft 72 supported upon centrally located brackets 73 connected to the outer perimeter of the stationary frame 18. A pulley 74 is journalled upon a bracket 75 on the side of the platform 6 toward the cylinder 61 and a pulley 76 is journalled upon a bracket 77 adjacent thereto. At the opposite end of the transversely disposed frame 62 are journalled a pulley 78 upon a bracket 79 and a pulley 80 upon a bracket 81.

A cable 82 has one end thereof fixed, as at 83, to the end of the transverse frame 62 adjacent the cylinder 61. This cable then extends around the upper pulley 65 in the yoke 64, then around the pulley 74, then around the next lower pulley 66 in the yoke 64, then around the pulley 76, then around the pulley 70 and the other end thereof is connected to one end of the rotary frame 19, as indicated at 84.

A second cable 85 is connected to the other end of the transverse frame 62, as indicated at 86, then extends around the lowermost pulley 68 in the yoke 64, then around the pulley 80, then around the pulley 67 in the yoke 64, then around the pulley 78, then around the pulley 71, the other end thereof being connected to the opposite ends of the rotary frame 19, as indicated at 87.

With this construction, when the piston rod 63 of the cylinder 61 is moved in one direction, the cable 85 will rotate the rotary frame 19 in clockwise direction and when the piston rod 63 is moved in the opposite direction, the cable 82 will rotate the rotary frame 19 in counter-clockwise direction.

From the above it will be obvious that a simple, inexpensive and easily operated apparatus is provided for easily and quickly digging trees for transplanting or for balling and burlapping.

It will also be seen that the improved tree digger construction may be easily attached to a tractor or other vehicle and the hydraulic or other fluid cylinder or motor means controlled from said vehicle.

It will further be seen that with this apparatus tree roots may be cut completely around a tree with a conical ball of earth surrounding the roots, and that the dug trees may be lifted from the ground and transported to any desired location where they may be raised up or lowered as desired.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A tree digger construction comprising support means, a substantially semi-circular horizontally disposed bed supported thereon, a substantially semi-circular frame rotatably slidably mounted upon said bed, a spaced pair of side plates fixed to each end of said rotatable frame, said side plates having arcuate slots therein, a channel guide member adjustably mounted between each pair of side plates, a spaced pair of transversely disposed sleeves attached to each channel guide member, adjusting bolts located through said sleeves and through said arcuate slots in said side plates, a pair of opposed angularly disposed spade blades slidably mounted in said channel guide members, means for projecting and retracting said spade blades, means for rotatably slidably moving said frame upon said bed, and means for raising and lowering said bed and frame.

2. A tree digger construction as defined in claim 1, in which the support means is an upright guide frame and the bed is vertically movable relative to said guide frame.

3. A tree digger construction as defined in claim 2 including means for connecting said upright guide frame to a vehicle.

4. A tree digger construction as defined in claim 2, in which the bed is fixed upon a platform vertically slidably mounted upon said guide frame.

5. A tree digger construction as defined in claim 4, in including fluid cylinder means for slidably moving the platform upon said guide frame.

6. A tree digger construction as defined in claim 2, in which each spade blade is projected and retracted by a fluid cylinder.

7. A tree digger construction as defined in claim 5, in which each spade blade is projected and retracted by a fluid cylinder.

8. A tree digger construction as defined in claim 4, in which a sprocket wheel is journalled upon said platform, a sprocket chain is located around said sprocket wheel and opposite ends of the chain are connected to opposite ends of said rotatable frame, and reversible motor means is located upon said platform for oscillating said sprocket wheel.

9. A tree digger construction as defined in claim 4, in which a fluid cylinder is mounted upon the platform, the piston rod of said cylinder having a yoke upon its end, a plurality of pulleys journalled in said yoke, other pulleys journalled upon the platform, a first cable which has one end connected to one end of the rotatable frame and which is located around certain of the pulleys in said yoke and certain of said other pulleys, the other end of said first cable being connected to the platform, and a second cable which has one end connected to the other end of said rotatable frame and which is located around certain other pulleys in said yoke and certain other of said other pulleys, the other end of said second cable being connected to the platform.

(References on following page)

References Cited

UNITED STATES PATENTS

| | | | |
|---|---|---|---|
| 981,268 | 1/1911 | Hurd | 254—189 |
| 3,017,707 | 1/1962 | Sigler et al. | 37—2 |
| 3,017,708 | 1/1962 | Gardner | 37—2 |
| 3,017,709 | 1/1962 | Sigler | 37—2 |
| 3,191,982 | 6/1965 | Goalard | 37—2 |

WILLIAM B. PENN, *Primary Examiner.*

EUGENE H. EICKHOLT, *Assistant Examiner.*